Aug. 17, 1943.   H. BIELER   2,326,922
CUTTER GUIDING MEANS
Filed Aug. 7, 1939   3 Sheets-Sheet 1
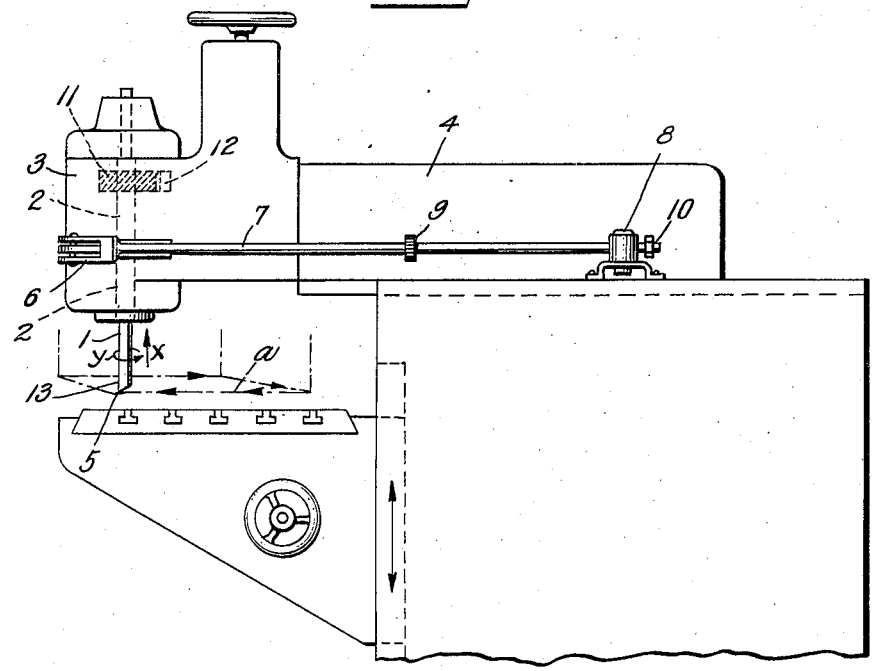
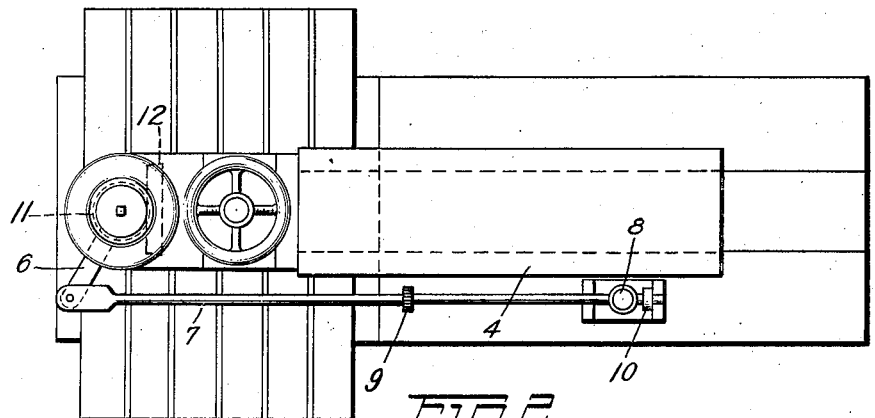
Inventor.
Hermann Bieler
By [signature]
Attorney.

Aug. 17, 1943.  H. BIELER  2,326,922
CUTTER GUIDING MEANS
Filed Aug. 7, 1939  3 Sheets-Sheet 2

Inventor.
Hermann Bieler
By *[signature]*
Attorney.

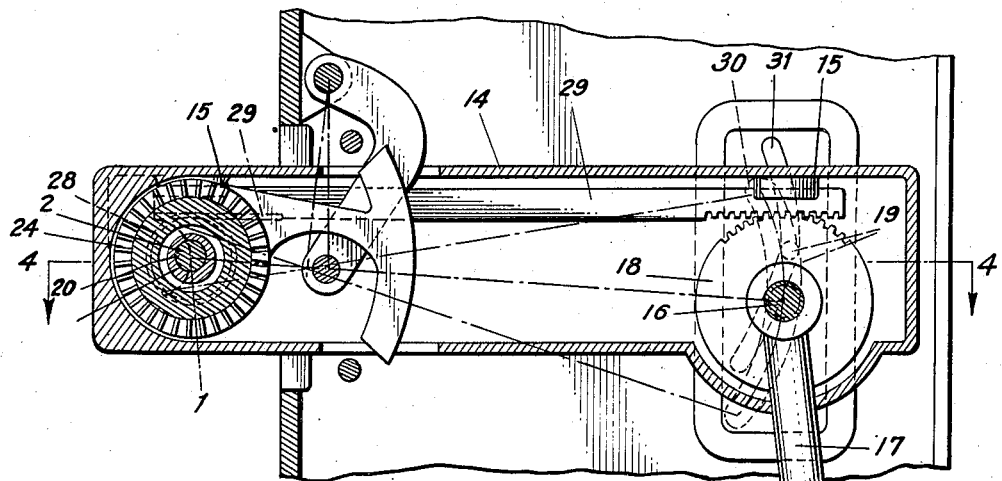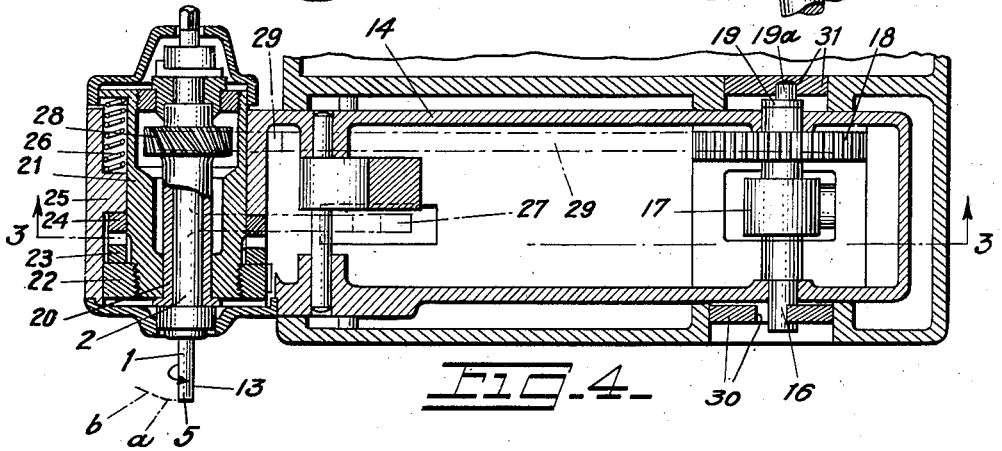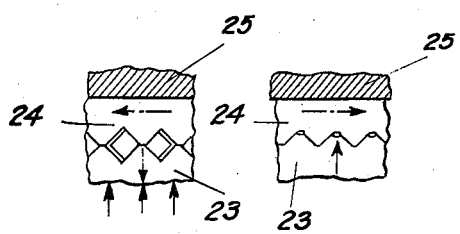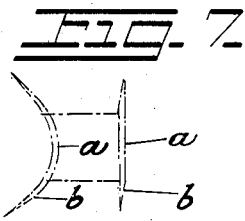

Patented Aug. 17, 1943

2,326,922

UNITED STATES PATENT OFFICE 2,326,922

CUTTER GUIDING MEANS

Hermann Bieler, Kothen, Anhalt, Germany; vested in the Alien Property Custodian

Application August 7, 1939, Serial No. 288,851
In Germany August 8, 1938

8 Claims. (Cl. 90—55)

This invention relates to guiding means, and refers more particularly to a device for guiding a reciprocating machine tool used for the cutting or shaving of a workpiece. The invention is particularly concerned with the guiding of a reciprocating cutting or shaving tool having two cutting edges extending at an angle to each other, namely, one cutting edge which detaches a cutting or shaving in the direction of the movement of the tool and a second cutting edge which usually extends transversely to the first one and which is used for providing a recess or cut-out portion of a certain form in the workpiece.

An object of the present invention is to guide the machine tool in such manner that in the course of its return movement its cutting edges are effectively moved out of contact with the workpiece and remain out of contact during the return movement.

Another object is the provision of a device having simple and effective operating means which impart automatically the necessary movements to the tool at the end of its work stroke, in order that its cutting edges may be moved out of contact with the workpiece in the course of its return movement, said means automatically moving the tool back to its operative position at the end of its return movement.

A further object is the provision of a device for raising, lowering, and turning a machine tool, said device being actuated by steering means which operate in a predetermined manner and which are simple in construction and effective and reliable in operation.

Other objects of the present invention will appear in the course of the following specification.

The objects of the present invention may be realized through the provision of a device which is so constructed that the machine tool after the completion of its operating stroke in the course of which it detaches cuttings and shavings, is moved perpendicularly to the direction in which the workpiece has been worked upon and away from the workpiece, and, in particular, is raised from the workpiece, while at the same time it carries out a turning movement, so that during the return stroke it is in a position in which its cutting edges are out of contact with the workpiece.

Therefore, in accordance with the present invention, means are provided through the use of which the machine tool is so actuated before the beginning of its return movement that not only its forward cutting edge is raised from the workpiece, but it is also turned in such manner that its form-cutting edge is moved out of contact with the workpiece. Suitable means are also provided by means of which this turning movement of the machine tool takes place at the course of its reciprocatory motion.

The invention is applicable to machine tools the tool of which carries out a straight reciprocatory motion, as well as to such machines wherein the tool is moved along a curve. For instance, the subject-matter of the present invention may be utilized in planing machines of the usual type, and in such planing machines wherein the tool is carried by a swinging lever.

The invention will appear more clearly from the following detailed description when taken in connection with the accompanying drawings showing by way of example preferred embodiments of the inventive idea.

In the drawings:

Figure 1 is a side elevation of a device constructed in accordance with the principles of the present invention;

Figure 2 is a plan view of the device shown in Figure 1;

Figure 3 is a longitudinal section along the line III—III of Fig. 4 through a differently constructed machine;

Figure 4 is a section along the line IV—IV of Figure 3;

Figures 5 and 6 are diagrams illustrating two rings shown in Figure 4 in two different positions;

Figure 7 is a diagram illustrating the movement of the tool shown in Figure 4.

Figure 1A:
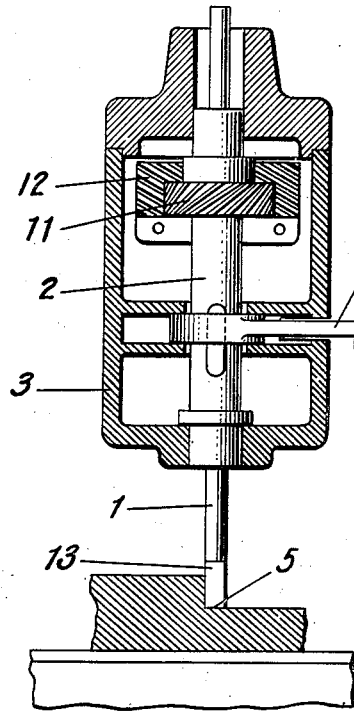
Figures 1a and 1b are sections through the casing head and illustrate the device in two different positions.
Figure 1B:
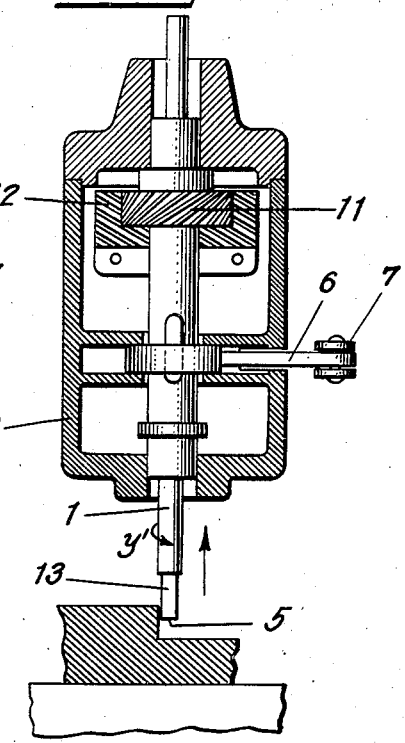

Figures 1, 1a, 1b and 2 illustrate a planing machine of the usual type wherein the planing steel or tool 1 is reciprocated along a straight line in one plane. The tool 1 is firmly carried by a toolholder 2, which is situated within a casing head 3. The tool-holder 2 is so mounted that it can turn within the head 3 about its longitudinal axis and is also movable longitudinally in the direction of its axis.

The casing head 3 constitutes a part of a support 4 having the form of a sled which is carried by the machine frame and which is reciprocated thereon along straight lines by any suitable means known in the art and not shown in the drawings.

The machine tool 1 has a forward cutting edge 5 used for raising cuttings or shavings from a workpiece, and also a form-cutting edge 13 extending transversely to the cutting edge 5. The cutting edge 5 extends transversely to the direction of the movement of the tool and in the course of the reciprocation of the tool carries out a movement which is shown by arrows and broken lines in Figure 1 and which has the form of an elongated parallelogram. The side *a* of this parallelogram indicates the path traversed by the cutting edge 5 in the course of its operative cutting stroke, while it detaches shavings and cuttings from the workpiece. At the end of this operative stroke, the tool 1 is raised along with its holder 2 so that it is moved away from the workpiece in the direction of the longitudinal axis of the tool, while the forward movement of the tool still continues. This part of the movement, in the course of which the cutting edge 5 of the tool 1 is raised from the workpiece, is represented by the side *b* of the parallelogram shown in Figure 1.

The device used for carrying out this movement, namely, for raising the tool 1 away from the workpiece, consists of a drive, which will be described in greater detail hereinafter, and which is situated within the head 3 of the support 4.

This device includes a lever 6, shown in Figure 2 and extending out of the head 3. The lever 6 is pivotally connected with one end of a steering rod 7, which extends along one side of the movable support 4 and which is guided in a bearing 8 in such manner that it can move longitudinally within the bearing.

The rod 7 carries abutments or rings 9 and 10 which are located at predetermined distances from each other and from the bearing 8, so that they can cooperate with the bearing 8 for the purpose of limiting the movement of the rod 7.

The drive situated within the head 3 of the support 4 comprises also a gear wheel 11 mounted upon the tool-holder 2 and meshing with an immovable toothed rack 12. The wheel 11 and the rack 12 have helical teeth.

Figure 2A:
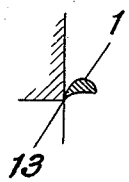
Figures 2a and 2b are diagrams illustrating the turning of the tool.
Figure 2B:
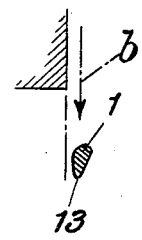

The device is operated as follows:

When the course of the forward movement of the tool 1 the end of the path *a* is reached, the ring 10 strikes the bearing 8, thereby preventing any further forward movement of the rod 7. Since the head 3 and the support 4 continue their forward movement, the lever 6, which is firmly connected with the tool-holder 2, will swing along with the tool-holder about the longitudinal axis of the tool-holder in the direction of the arrow *y* in Figure 1b. Since the gear wheel 11 is also firmly connected with the tool-holder 2, it will turn relatively to the immovable rack 12, the helical teeth of which mesh with the helical teeth of the gear wheel 11, and thus the tool-holder 2 in the course of its turning movement about its longitudinal axis will also move upwardly from the position shown in Figure 1a to the position shown in Figure 1b. Figures 2a and 2b show that then the form cutting edge 13 of the tool 1 will also move away from the workpiece.

At the end of the return movement of the tool 1, the ring 9 will strike the bearing 8, and then the same operation will be repeated, but in the opposite direction, until the cutting edges of the tool are moved back into their original operative positions at the beginning of the path *a*.

The principles of the drive are substantially similar, irrespective of the fact as to whether the tool is reciprocated along a straight line or along a curved path. Figures 3 to 7 show one of the modifications of the inventive idea wherein the tool is carried by a reciprocating and swinging lever.

The tool 1 shown in Figure 3 is carried by a tool-holder 2, which is situated within a sleeve 20. The sleeve 20 is so mounted within a head 25 of a swinging lever 14 that it can rotate therein about its longitudinal axis. The lever 14 constitutes a casing and is swingable about a bolt 32.

The sleeve 20 carries a gear wheel 28 which meshes with a toothed rack 29.

The gear wheel 28 and the toothed rack 29 correspond to the gear wheel 11 and the rack 12 of the device shown in Figures 1 and 2 and have substantially the same functions.

However, the rack 29 is quite long and it is movable longitudinally within the swinging lever 14. The edges of the lever 14 are used to guide the rack 29.

A pin 16 is situated at the opposite end of the lever 14 and is engaged by a driving or connecting rod 17 the opposite end of which is connected to a driving mechanism not shown in the drawings.

The rod 17 causes the lever 27 to swing in a direction at right angles to the plane of Figure 4 and the path of this swinging movement of the lever 14 is influenced by the guide 30 carried by the pin 16.

The pin 16 is firmly connected with a gear wheel 18 which also meshes with the rack 29.

A steering crank arm 19 is firmly connected with the gear wheel 18 and is provided with a pin 19a guided by a curved guide 31 the operative surfaces of which extend transversely to the plane of Figure 4.

The guides 30 and 31 are so arranged in relation to each other that during the swinging movements of the lever 14 caused by the connecting rod 17, the gear wheel 18 will be rotated to a predetermined extent.

The rotation of the gear wheel 18 which meshes with the rack 29 will cause a movement of the rack 29 relatively to the lever 14. Since the rack 29 meshes with the gear wheel 28, which is firmly connected with the sleeve 20, the rotation of the gear wheel 18 will be transmitted to the sleeve 20 carrying the tool-holder 2 and the tool 1.

The sleeve 20 is rotatably mounted within a second sleeve 21 which is situated within the head 25 of the swinging lever 14 and is axially movable therein, as illustrated in Figure 4.

The pressure to which the tool 1 is subjected in the course of its operative stroke while it detaches cuttings or shavings from the workpiece, is transmitted by the sleeves 20 and 21 to a ring 22 which is firmly mounted upon the sleeve 21. The ring 22 is connected with a cam ring 23 which does not rotate relatively to the ring 22 and is shown in Figures 4 to 6. A second cam ring 24 is rotatably mounted upon the sleeve 21 and is supported by the head 25 of the swinging lever 14 and co-operates with the ring 23 to form a height-adjusting device.

A coil spring 26 presses upwardly against the sleeve 21 and is also supported by the head 25 of the lever 14. The pressure of the spring 26 is so directed that it tends to raise the sleeve 21, the sleeve 20, the tool-holder 2 and the tool 1 connected therewith.

The cam ring 24, which is rotatably mounted upon the sleeve 21, carries a lever 27 having the form of a hammer extending transversely to the plane of Figure 4. The path of movement of the lever 27 is limited by two pieces or abutments, which are shown in Figure 3, and which are situated on both sides of the free hammer-like end of the lever 27, so that the free end of the lever 27 strikes consecutively against the abutments in the course of the two reversals of the reciprocatory movement of the swinging lever 14.

The rack 29 and the gear wheel 28 are provided with helical teeth, as shown in Figure 4.

The described machine is so constructed that in the course of the operative stroke of the lever 14, the cam ring 24 is situated in the position shown in Figure 5, in which position the teeth or cam-like projections of the ring 24 are situated opposite corresponding teeth or cam-like projections of the immovable ring 23, these teeth being in contact with each other. In order to hold the device in this position, the front surfaces of the teeth of the two rings 23 and 24 are curved in opposed directions, so that they can engage each other in the manner shown in Figure 4.

In this position of the rings 23 and 24, the sleeves 21 and 20 and the tool 1 carried by the tool-holder 2 are situated in their lowermost operative position.

At the end of each operative stroke of the lever 14, the hammer-like lever 27 strikes against one of the immovable abutments. This causes a turning of the movable cam ring 24, so that its projections are moved between the corresponding projections of the immovable ring 23.

Then the spring 26 can raise the sleeves 21 and 20, the rings 22 and 23 and the tool 1 carried by its holder 2 to an extent corresponding to a decrease in the operative height of the rings 23 and 24. This position is shown in Figure 6 of the drawings. In this position, the total operative height of the two cam rings 23 and 24 is correspondingly shortened by the interengagement of their projections and the action of the spring 26. Then the forward cutting edge 5 of the tool 1 is moved out of engagement with the workpiece. However, in the course of this upward movement of the sleeve 21 caused by the spring 26, the helical teeth of the gear wheel 28 meshing with the rack 29 cause the sleeve to turn about its longitudinal axis to an extent corresponding to the upward stroke of the sleeve 21. This turning movement is made possible since the rack 29 constitutes a counter-support for the gear wheel 28.

The turning movement of the tool 1, which is caused by the described construction, withdraws the form-cutting edge 13 of the tool 1 from engagement with the surface of the workpiece at the end of each operative stroke of the lever 14.

When planing steels or tools having a front cutting edge and a form-cutting edge are utilized, whereby the cutting edges while moving along a curved path (Fig. 7) produce a comparatively narrow cut in the workpiece, it is advisable to arrange the parts causing the turning movement in such manner that the steel or tool 1 is turned about a longitudinal axis, which passes through the middle of its front cutting edge.

The movement of the tool 1 is thus caused in this construction, in the first place, by a rotation of the gear wheel 18 caused by the guides 30 and 31 in the course of the swinging movement of the lever 14 about the pin 32, said swinging movement being caused by the connecting rod 17; and in the second place, by the operation of the lever 27 moving the ring 24 from the position shown in Figure 5 to the position shown in Figure 6 and vice versa during the reversals of the reciprocatory or swinging movement of the lever 14, the position of the ring 24 shown in Figure 6 making it possible for the spring 26 to raise the sleeve 20 along with the tool 1 and at the same time to turn the tool 1 due to the meshing of the gear wheel 28 with the gear wheel 29.

It is apparent that as far as the operation of the devices constructed in accordance with the principles of the present invention are concerned, it is substantially immaterial whether the tool is reciprocated along a straight line, as in the construction shown in Figure 2, or along a curved path, as in the construction in Figure 3. In both these instances, the tool at the end position of its operative stroke carries out substantially the same vertical and turning movements indicated by the arrows x and y in Figures 1 and 3.

An important distinction is that in the construction shown in Figures 1 and 2, the counter-support for the toothed wheel 11 is constituted by an immovable rack 12, which is firmly embedded in the casing, while in the construction shown in Figure 3, the rack 29 is movable longitudinally by the gear wheel 18.

It is desirable to combine the rod 7 shown in Figures 1 and 2, the rings 9 and 10 of which strike against the bearing 8, with the lever 27, shown in Figure 3 and firmly connected with the movable cam ring 24.

Many other variations and modifications may be made in the described structures without departing from the scope or intent of the invention, all of which variations and modifications are to be included within the scope of the present invention.

What is claimed is:

1. A device for guiding a reciprocable tool having at least two cutting edges adapted to engage a workpiece, said device comprising in combination with a tool holding element; means moving said tool holding element, and means connected with said tool holding element and operable at the completion of the cutting operation to raise the tool off the workpiece and simultaneously turn the tool to bring both cutting edges of the tool out of contact with said work piece.

2. A device for guiding a reciprocable tool having at least two cutting edges adapted to engage a workpiece said device comprising, in combination with tool holding means; means moving said tool holding means, means connected with said tool holding means and adapted to move said tool holding means in a direction perpendicular to the movement of the tool in the course of the cutting operation, steering means connected with the second-mentioned means and operable at the end of said cutting operation to actuate the last-mentioned means and cause the last-mentioned means to move the tool holding means in said perpendicular direction, and means engaging at least a part of said tool-holding means to turn said tool in the course of the movement of said tool holding means in said perpendicular direction.

3. A device for guiding a reciprocable tool having at least two cutting edges adapted to engage a workpiece, said device comprising, in combination with tool holding means; means moving said tool holding means, means connected with said tool holding means and adapted to move said tool holding means in a direction perpendicular to the movement of the tool in the course of the cutting operation, elements movable relatively to each other to vary the operative height of said elements and connected with said tool holding means to maintain the tool in an operative position and a raised position depending upon the operative height of said elements, steering means operable at the end of said cutting operation to cause a relative movement of said elements and enable the means moving the tool holding means in said perpendicular direction to carry out that movement, and means engaging at least a part of said tool holding means to turn said tool in the course of the movement of said tool holding means in said perpendicular direction.

4. A device for guiding a reciprocable tool having at least two cutting edges adapted to engage a workpiece, said device comprising, in combination with tool holding means; means moving said tool holding means, means connected with said tool holding means and adapted to move said tool holding means in a direction perpendicular to the movement of the tool in the course of the cutting operation, a pair of interengaging rings having teeth which are in contact with other, one of said rings being movable relatively to the other ring, whereby the operative height of said rings is varied, at least one of said rings being connected with said tool holding means to maintain the tool in an operative position and a raised position depending upon the operative height of said rings, steering means connected with the movable ring and operable at the end of said cutting operation to move the movable ring relatively to the other ring and thereby enable the means moving the tool holding means in said perpendicular direction to carry out that movement, and means engaging at least a part of said tool holding means to turn said tool in the course of the movement of said tool holding means in said perpendicular direction.

5. A device for guiding a reciprocable tool having at least two cutting edges adapted to engage a workpiece, said device comprising in combination with a tool holding element; means moving said tool holding element, means connected with said tool holding element and operable at the completion of the cutting operation to raise the tool off the workpiece, means connected with said tool holding element and movable therewith and constituting at least one inclined surface, and means which do not participate in said movement of the tool holding element and which constitute at least one inclined surface to turn the tool holding element in the course of its said movement.

6. A device for guiding a reciprocable tool having at least two cutting edges adapted to engage a workpiece, said device comprising in combination with a tool holding element; means moving said tool holding element, means connected with said tool holding element and operable at the completion of the cutting operation to raise the tool off the workpiece, a gear wheel firmly connected with said tool holding element and movable therewith, said gear wheel having helical teeth, and means which do not participate in said movement of the tool holding element and which comprise a plurality of helical teeth meshing with said gear wheel to turn the tool holding element in the course of its said movement.

7. A device for guiding a reciprocable tool having a forward cutting edge and a form cutting edge adapted to engage a workpiece, said device comprising in combination with a tool holding element; means moving said tool holding element, and means connected with said tool holding element and operable at the completion of the cutting operation to raise the tool off the workpiece and simultaneously turn the tool about a longitudinal axis passing through the middle of said form cutting edge to bring both cutting edges of the tool out of contact with said workpiece.

8. A device for guiding a reciprocable tool having at least two cutting edges adapted to engage a workpiece, said device comprising in combination with a tool holding element; means reciprocating said tool holding element to cause said tool to carry out its return movement, and means connected with said tool holding element and operable at the completion of the cutting operation perpendicular to the directions of its movements in the course of said cutting operation and said return movement and simultaneously turn the tool about a longitudinal axis, whereby both edges of the tool are brought out of contact with said work piece at the end of the cutting operation and are brought in contact with the work piece at the end of the return movement.

HERMANN BIELER.